Jan. 14, 1936.  R. J. BAIRD  2,027,364
MANUFACTURE OF MERCURY SULPHATE
Filed Feb. 4, 1932
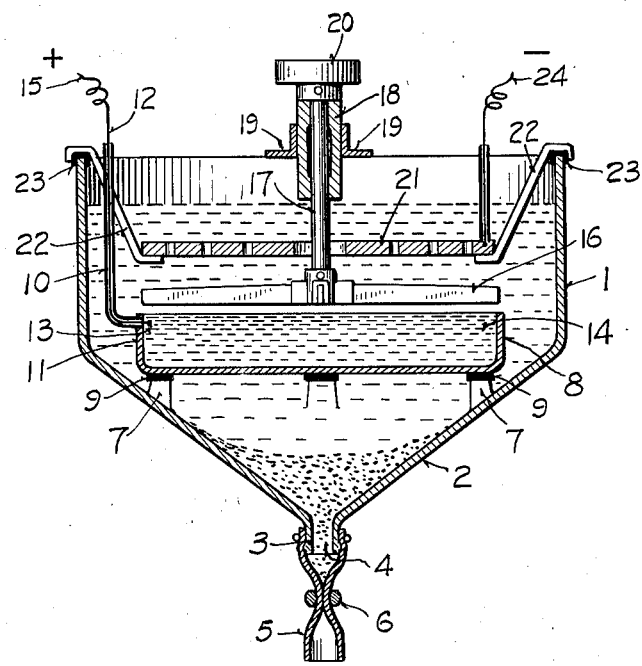
INVENTOR.
Ronald J. Baird
BY
ATTORNEY.

Patented Jan. 14, 1936

2,027,364

UNITED STATES PATENT OFFICE 2,027,364

MANUFACTURE OF MERCURY SULPHATE

Ronald J. Baird, Milwaukee, Wis.

Application February 4, 1932, Serial No. 590,918

14 Claims. (Cl. 204—9)

The invention relates to the manufacture of compounds of mercury and has for an object the manufacture of a catalyst. Another object of the invention is to produce a new method of making a sulphate of mercury. Other objects of the invention will be apparent from the following description and the accompanying drawing.

According to the present invention, the sulphate of mercury is produced in a single operation. Mercury is placed in a bath comprising a water solution which contains a soluble substance containing sulphate ions and a soluble substance containing an anion which forms a water soluble mercury salt. The bath is electrolyzed and an insoluble sulphate of mercury is produced.

The following specific embodiment is illustrative of the invention and represents one mode in which the invention can be carried out but it is to be understood that the invention is not limited thereto and that modifications thereof may be made without departing from the invention.

Metallic mercury is placed in a water solution containing about 2% of sulphuric acid and about 10% of sodium nitrate, by weight. The solution is electrolyzed by making the mercury an anode and passing a direct current of about 0.5 of an ampere per square decimeter of mercury surface through the solution. Crystals of insoluble mercurous sulphate are formed directly above the metallic mercury. These crystals are removed from the solution and are ready for use as a catalyst.

If it is desirable to remove traces of electrolyte which may be present on the crystals they can be removed by washing the crystals in water and drying them. The washed product is substantially pure crystalline mercurous sulphate.

The sodium nitrate appears to act as a catalyst in the preparation of the sulphate and it does not have to be replenished as the process is continued. Mercury, sulphuric acid and water are replenished as they are consumed or evaporated so as to substantially preserve the above stated proportions of the electrolyte and to provide metallic mercury.

The invention may be explained on the following hypothesis but it is to be understood that the invention is not limited thereto. It appears that the solution becomes dissociated yielding Na+ as a cation and NO3— as an anion. The NO3 anion combines with the Hg of the anode and forms a soluble mercurous nitrate, $$Hg + NO_3 \rightarrow HgNO_3 \quad (1),$$

which reacts with the sulphuric acid and forms an insoluble mercurous sulphate, $$2HgNO_3 + H_2SO_4 \rightarrow Hg_2SO_4 + 2HNO_3 \quad (2).$$

The Na cation combines with water which is present in the solution and forms sodium hydroxide, $$2Na + 2H_2O \rightarrow 2NaOH + H_2 \quad (3)$$

which hydroxide unites with the nitric acid formed simultaneously with the mercurous sulphate in equation (2) and reforms the sodium nitrate which was originally in the solution, $$NaOH + HNO_3 \rightarrow NaNO_3 + H_2O \quad (4).$$

The mercurous sulphate crystals do not form on the immediate surface of the mercury so as to produce a crust or a sludge. They are formed in the solution above the surface of the mercury and they may be readily removed and collected out of contact therewith.

The size and density of the crystals formed is of prime importance in the use of mercurous sulphate as a catalyst. The sulphate is especially intended for use as a catalyst in a bath which is subject to foaming. When the catalyst used in such a bath is in a fine or flocculent condition, considerable entrainment losses thereof in the foam have been found to take place and when the catalyst is in a coarse and crystalline or dense condition, the entrainment losses of the catalyst have been found to be small or negligible. It has been found that the above mentioned solution containing about 2% of sulphuric acid and about 10% of sodium nitrate and carrying a current of about 0.5 of an ampere per square decimeter yields dense crystals of sufficient size to be particularly adapted for use as a catalyst in a foaming bath with substantially negligible entrainment losses. The use of a larger percentage of the sulphuric acid gave smaller crystal sizes. A current density of about 1.0 ampere per square decimeter with the 2% sulphate solution gave small and less dense crystals of the mercurous sulphate.

By varying the concentration of the SO4 and the NO3 ions and by varying the ratio of the SO4 ions to the NO3 ions, different sized crystals of the mercurous sulphate are formed.

Atmospheric temperatures and pressures are used.

Other compounds may be employed in the electrolyte and produce various sizes of crystals of mercurous sulphate. The sulphuric acid may be replaced with soluble sulphates and the sodium nitrate may be replaced with soluble salts whose anion will form a soluble salt with mercury and will not dissolve the mercurous sulphate in the electrolyte. Salts which may be used are, for example, the nitrates, chlorates, or acetates of sodium, potassium, magnesium, aluminum or ammonium. Soluble sulphates which may be used are, for example, sodium, ammonium, magnesium or potassium sulphates.

The single figure in the accompanying drawing is a cross-sectional view in elevation of one form of apparatus with which the present invention can be carried out.

In the drawing, the numeral 1 refers to a cylindrical container made of an acid resistant material, such as glass, lead, rubber, enameled steel, wood or concrete. The container is provided with a conically shaped bottom 2 which terminates in a flanged portion 3 and forms an opening 4 through the bottom of the container. A flexible tubing 5 is fitted over the flanged portion 3 and a clip 6 is provided to pinch the sides of the tubing 5 together so as to close communication through the opening 4 to the outside. Within the container and positioned at intervals around the conical portion 2 are a plurality of bosses or supports 7 upon which there is supported a shallow vessel 8 composed of acid resistant material which may also be non-conductive such as glass, rubber or wood. Resilient and insulating cushions 9 may be positioned on the supporting surfaces of bosses 7 to improve the insulation of non-conductive vessel 8 from the tank 1 or to provide insulation when a conductive acid-resistant vessel is used. A tubular conduit 10 composed of insulating material extends through the side wall 11 of the vessel 8 and an electrical conductor 12, which is passed through the conduit 10, terminates in a projection 13 within the vessel 8. The vessel is filled with metallic mercury 14 and electrical connection is made between the mercury and the projection 13. The conductor 12 is adapted to be connected to a positive terminal 15 of a source of direct current.

An agitator or sweep 16 is secured to the lower end of shaft 17 which is journaled in a bearing 18. The bearing is supported by angle irons 19 which are mounted across the top of vessel 1 and the shaft 17 is rotated by means of a pulley 20. The sweep 16 is positioned in a horizontal plane above and adjacent to the surface of the mercury 14.

Between the sweep 16 and the top of the container 1 a perforated disk 21 of a conductive material, such as copper or lead, is supported on brackets 22 which are secured to and depend from the top of the container 1. The perforations permit escape of hydrogen that is formed during the process. Insulation 23 is placed between the container 1 and the brackets 22. The disk 21 is adapted to be connected to a negative terminal 24 of the source of direct current.

The various detailed parts of the apparatus are made of materials which are suitable to the function they are to serve and to the nature of the surrounding medium. The particular material to be used for the various parts will readily suggest itself to the chemist.

The water solution containing about 2% sulphuric acid and about 10% sodium nitrate is poured into the vessel 1 so that the disk 21 will be submerged. The electric circuit is closed and the agitator 16 is rotated to sweep the mercurous crystals over the edge of the vessel 8. The mercurous crystals have a high specific gravity and they collect in the bottom of the container 1 from which they may be withdrawn by releasing the clip 6 on the flexible hose 5. About 2 volts are applied to the electrodes 14 and 21 which are spaced about one and one-half inches apart and a current of about 0.5 of an ampere per square decimeter is passed through the electrolyte.

The invention provides a method of making a compound of mercury, which is simple and direct. No sludge or crust is formed on the surface of the mercury, and, therefore, there is no obstruction to continued operation of the process and no loss of metallic mercury due to entrainment thereof in the crystals which are removed. The new process enables the size of the crystals of the mercury sulphate to be controlled at will.

I claim:

1. A method of making a crystalline mercurous sulphate catalyst which comprises contacting a solution containing about 2% sulphuric acid and about 10% sodium nitrate with mercury; passing a direct current of electricity through the solution while making the mercury the anode; and maintaining a current density at the anode of about 0.5 to 1 ampere per square decimeter.

2. A method of producing mercurous sulphate which comprises placing mercury in a solution of about 2% sulphuric acid and about 10% sodium nitrate; and electrolyzing the solution with the mercury serving as the anode.

3. A method of making mercurous sulphate which comprises making a water solution containing about 2% of a water soluble sulphate and about 10% of a water soluble salt having another anion which forms a water soluble compound with mercury; positioning mercury in the solution; and passing a unidirectional electric current through the solution, the mercury serving as an anode and as the source of mercury therein.

4. A process of making mercurous sulphate which comprises electrolyzing a solution containing metallic mercury, about 2% sulphuric acid and about 10% sodium nitrate while the mercury serves as the anode; and separating the crystals which are formed from the solution.

5. A method of producing mercurous sulphate which comprises contacting mercury with a water solution containing a soluble sulphate and about 10% of a soluble salt whose anion will form a soluble salt with mercury; passing a direct electric current through the solution wherein the mercury contitutes the positive terminal; and continuously separating the mercurous sulphate crystals, which are formed by the above step, and the solution.

6. The method of making crystalline mercurous sulphate which comprises passing a unidirectional current through a conductive water solution containing a soluble sulphate and a soluble salt having another anion which forms a water soluble salt of mercury and does not bring mercurous sulphate into solution, disposing mercury at one terminal of the circuit so as to constitute an anode, maintaining a current density at this anode of about .5 to 1 ampere per square decimeter, and removing the mercurous sulphate formed in the vicinity of the anode.

7. The method of making crystalline mercurous sulphate which comprises passing a unidirectional current through a conductive water solution containing a soluble sulphate and a soluble salt having another anion which forms a water soluble salt of mercury and does not bring mercurous sulphate into solution, disposing mercury at one terminal of the circuit so as to constitute an anode, and removing the mercurous sulphate formed in the vicinity of the anode, said current being regulated to give a current density of 0.5 of an ampere per square decimeter of mercury exposed to the solution.

8. The method of making crystalline mercurous sulphate catalyst which comprises passing a unidirectional current through a conductive water solution containing sulphuric acid and a soluble salt having another anion which forms a water soluble salt of mercury and does not bring mercurous sulphate into solution, disposing mercury at one terminal of the circuit so as to constitute an anode, maintaining a current density at this anode of between about .5 to 1 ampere per square decimeter, and removing the mercurous sulphate formed in the vicinity of the anode.

9. The method of making crystalline mercurous sulphate which comprises passing a unidirectional current through a conductive water solution containing sulphuric acid and a soluble salt of the group consisting of the nitrate, acetate and chlorate of sodium, potassium, ammonium, magnesium and aluminum; disposing mercury at one terminal of the circuit so as to constitute an anode; and removing the mercurous sulphate formed in the vicinity of the anode.

10. The method of making crystalline mercurous sulphate which comprises passing a unidirectional current through a conductive water solution containing a soluble sulphate and a soluble salt of the group consisting of the nitrate, acetate and chlorate of sodium, potassium, ammonium, magnesium and aluminum; disposing mercury at the anode to give a current density of about 0.5 of an ampere per square decimeter of anode surface exposed to the solution; and removing the mercurous sulphate formed in the vicinity of the anode.

11. The method of making crystalline mercurous sulphate which comprises passing a unidirectional current through a conductive water solution containing a soluble sulphate of the group consisting of sulphuric acid, and sulphate of sodium, potassium, ammonium and magnesium with a soluble salt of the group consisting of the nitrate, acetate and chlorate of sodium, potassium, ammonium, magnesium and aluminum; disposing mercury at the anode to give a current density of about 0.5 of an ampere per square decimeter of anode surface exposed to the solution; and removing the mercurous sulphate formed in the vicinity of the anode.

12. A method of making a mercurous sulphate catalyst which comprises passing a direct current through a water solution and mercury which is disposed in the solution to serve as an anode, said water solution containing a dissociable sulphate and a soluble salt of a light metal having an anion which forms a soluble salt with a mercurous ion, and removing the mercurous sulphate as it is formed in the vicinity of the anode.

13. The method of making a crystalline mercurous sulphate catalyst which comprises passing a unidirectional current through a conductive water solution containing a soluble sulphate and a soluble salt of a group consisting of the nitrate, acetate, and chlorate of sodium, potassium, ammonium, magnesium, and aluminum; disposing mercury at the anode to give a current density of between .5 and 1 ampere per square decimeter of anode surface exposed to the solution; and removing the mercurous sulphate formed from the vicinity of the anode surface.

14. A catalyst containing mercurous sulphate obtained by a method including the use of a mercury anode and passing a unidirectional current, maintained at a current density of between about .5 to about 1 ampere per square decimeter of anode, through a conductive solution containing a soluble sulphate and a soluble salt having an anion which forms a soluble salt of mercury.

RONALD J. BAIRD.